(12) United States Patent
Will et al.

(10) Patent No.: US 12,252,044 B2
(45) Date of Patent: Mar. 18, 2025

(54) CONVERTIBLE CAR SEAT WITH ADJUSTABLE HEADREST

(71) Applicant: Britax Child Safety, Inc., Fort Mill, SC (US)

(72) Inventors: Adam Mark Will, Indian Land, SC (US); Lin Hsin Feng, Taibao (TW); Hou Jen En, Puzi (TW); Chou Yu Te, Fort Mill, SC (US); Yu Yung Fu, Fort Mill, SC (US)

(73) Assignee: Britax Child Safety, Inc.

( * ) Notice: Subject to any disclaimer, the term of this patent is extended or adjusted under 35 U.S.C. 154(b) by 36 days.

(21) Appl. No.: 18/109,674

(22) Filed: Feb. 14, 2023

(65) Prior Publication Data

US 2023/0256874 A1     Aug. 17, 2023

Related U.S. Application Data

(60) Provisional application No. 63/310,408, filed on Feb. 15, 2022.

(51) Int. Cl.
    *B60N 2/28*      (2006.01)
(52) U.S. Cl.
    CPC ......... *B60N 2/2851* (2013.01); *B60N 2/2806* (2013.01); *B60N 2/2863* (2013.01); *B60N 2/2884* (2013.01)
(58) Field of Classification Search
    CPC .................................................. B60N 2/2851
    See application file for complete search history.

(56) References Cited

U.S. PATENT DOCUMENTS

| | | | | |
|---|---|---|---|---|
| 8,136,881 | B2 * | 3/2012 | Vertegaal | B60N 2/2824 |
| | | | | 297/253 |
| 10,507,743 | B2 | 12/2019 | Oswald | |
| 10,807,506 | B2 | 10/2020 | Denbo | |
| 2014/0021758 | A1 * | 1/2014 | Chen | B60N 2/2851 |
| | | | | 297/256.11 |
| 2018/0222358 | A1 * | 8/2018 | Oswald | B60N 2/2827 |
| 2019/0070984 | A1 * | 3/2019 | Schmitz | B60N 2/2851 |
| 2022/0001775 | A1 * | 1/2022 | Chen | B60N 2/286 |
| 2023/0111534 | A1 * | 4/2023 | Taylor | B62B 9/104 |
| | | | | 224/160 |
| 2024/0101003 | A1 * | 3/2024 | Oltman | B60N 2/2884 |

FOREIGN PATENT DOCUMENTS

| | | | | |
|---|---|---|---|---|
| CA | 3023122 A1 * | 5/2019 | ........... | B60N 2/2839 |
| CN | 107199922 A  * | 9/2017 | | |
| CN | 107199924 A  * | 9/2017 | ............... | B60N 2/28 |
| CN | 108528292 A  * | 9/2018 | ........... | B60N 2/2851 |
| CN | 109532581 A  * | 3/2019 | ........... | B60N 2/2851 |
| CN | 111688553 A  * | 9/2020 | ............... | B60N 2/26 |
| CN | 112406646 A  * | 2/2021 | | |
| CN | 116533844 A  * | 8/2023 | | |
| CN | 117022071 A  * | 11/2023 | ............... | B60N 2/28 |
| KR | 200494203 Y1 * | 8/2021 | | |

* cited by examiner

*Primary Examiner* — Timothy J Brindley
(74) *Attorney, Agent, or Firm* — K&L Gates LLP (57) ABSTRACT

Systems and methods for a convertible car seat in accordance with embodiments of the invention are disclosed. In one embodiment, a convertible car seat includes an outer shell having a seat portion and a back portion, a base assembly having a mechanism for mounting the car seat, an adjustable headrest, and an adjustment mechanism.

12 Claims, 6 Drawing Sheets

CONVERTIBLE CAR SEAT WITH ADJUSTABLE HEADREST

CROSS-REFERENCE TO RELATED APPLICATIONS

The instant application claims priority to U.S. Provisional Patent Application No. 63/310,408, filed Feb. 15, 2022, entitled "CONVERTIBLE CAR SEAT WITH ADJUSTABLE HEADREST", the disclosure of which is hereby incorporated by reference in its entirety.

TECHNICAL FIELD

The present invention is generally related to child restraint systems, and more specifically to seats specially adapted for vehicles.

BACKGROUND

Convertible car seats are designed to protect children in vehicles from the effects of impacts or sudden changes in motion (e.g., sudden acceleration, sudden deceleration, etc.).

SUMMARY

Systems and methods for a convertible car seat in accordance with embodiments of the invention are disclosed. In one embodiment, a convertible car seat includes an outer shell having a seat portion and a back portion, a base assembly having a mechanism for mounting the car seat, an adjustable headrest, and an adjustment mechanism.

Other objects, advantages and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the claims.

BRIEF DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION

Turning now to the drawings, systems and methods for a convertible car seat in accordance with embodiments of the inventions are disclosed. A convertible car seat is a car seat that is used for children. Generally, there are two modes of convertible car seats, rear-facing and forward facing. Rear-facing convertible car seats can be used for newborn and toddlers. Forward-facing convertible car seats can be used for children that fit the height and weight requirements. While it is important for a car seat to be properly secured to a vehicle (e.g., car seat or underlying structure) to protect the child, it is also important that the car seat be properly sized and configured to support the child correctly and provide maximum protection in the event of an impact. As a child grows, their proportions change rapidly in the early years of life and any selected seat configuration will be quickly outgrown as the child develops. For example, in early infancy a child's bones are supple and capable of more flexure than those of an adult; however, their head and neck are particularly vulnerable to impact or sudden directional changes in momentum as the head is large and the supporting musculature of the neck is still developing. In such situations an improper amount, or location, of head and neck support through a headrest can result in reduced protection in the event of an impact. These issues can compound with improper harness placement because, in some convertible car seats, the position of the harness is dependent on the positon of the headrest. Thus, ensuring each component of the convertible car seat is the correct shape and in the correct location for the child supports the child both for everyday comfort and for an impact event.

Convertible car seats in accordance with embodiments of the invention include an adjustable headrest mechanism. The adjustable headrest mechanism allows a user to adjust a headrest of a convertible car seat to the position of a child. By allowing a user to adapt the position of the headrest to a child, a convertible car seat provides added comfort and safety for an impact event. Further, in various embodiments, the adjustable headrest moves concurrently with slots for the shoulder straps of a harness. When a user adjusts the adjustable headrest, the slots for the shoulder straps adjust along with the adjustable headrest, which ensures the harness is correctly placed in relation to the child. Correct placement of the harness also promotes comfort and safety for the child. Systems and methods for convertible car seats with adjustable headrests in accordance with embodiments of the invention are described in more detail below.

Convertible Car Seat

Figure 1A:
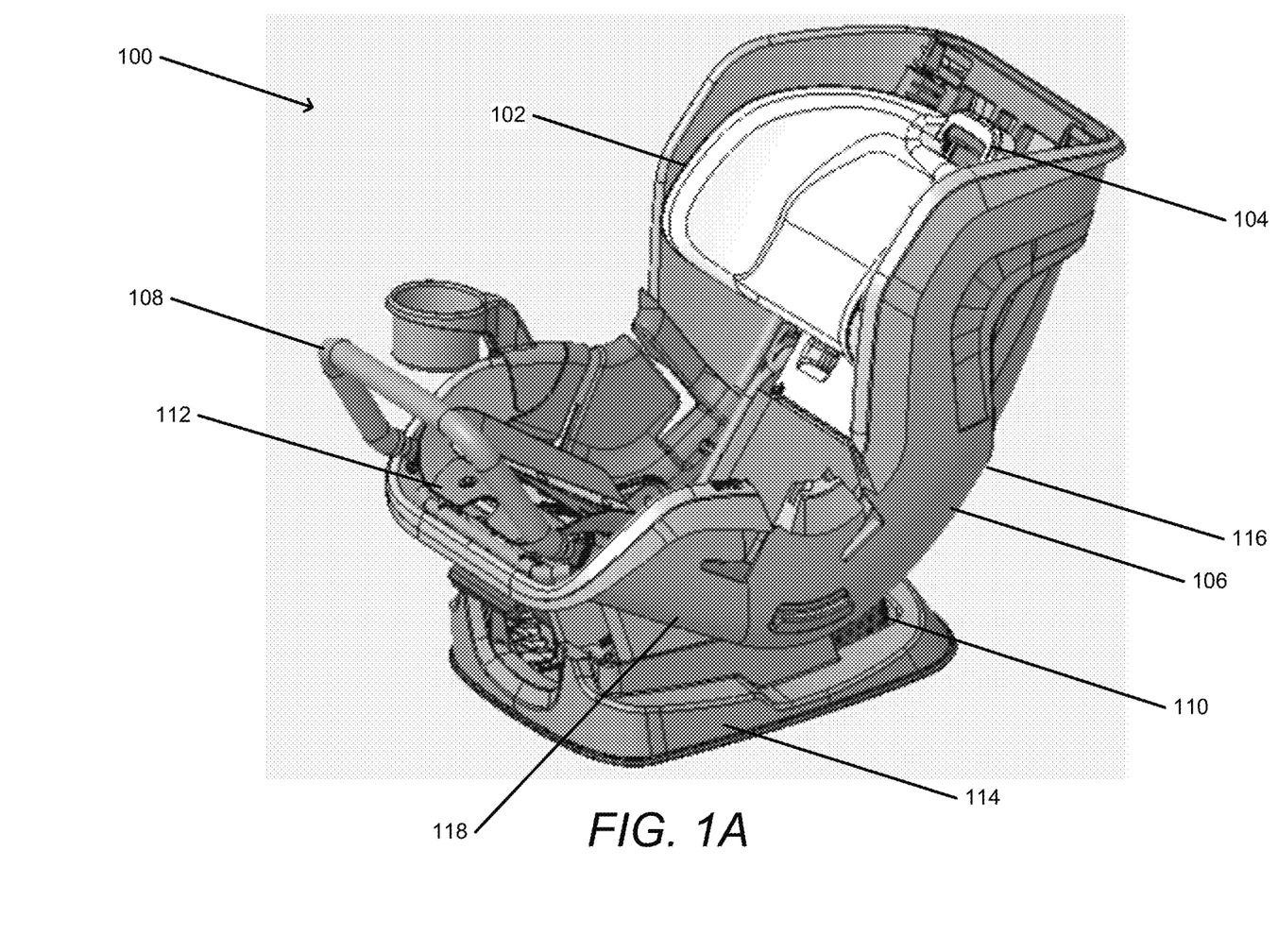
FIGS. 1A-B are renderings of a convertible car seat having an adjustable headrest in accordance with an embodiment of the invention.
Figure 1B:
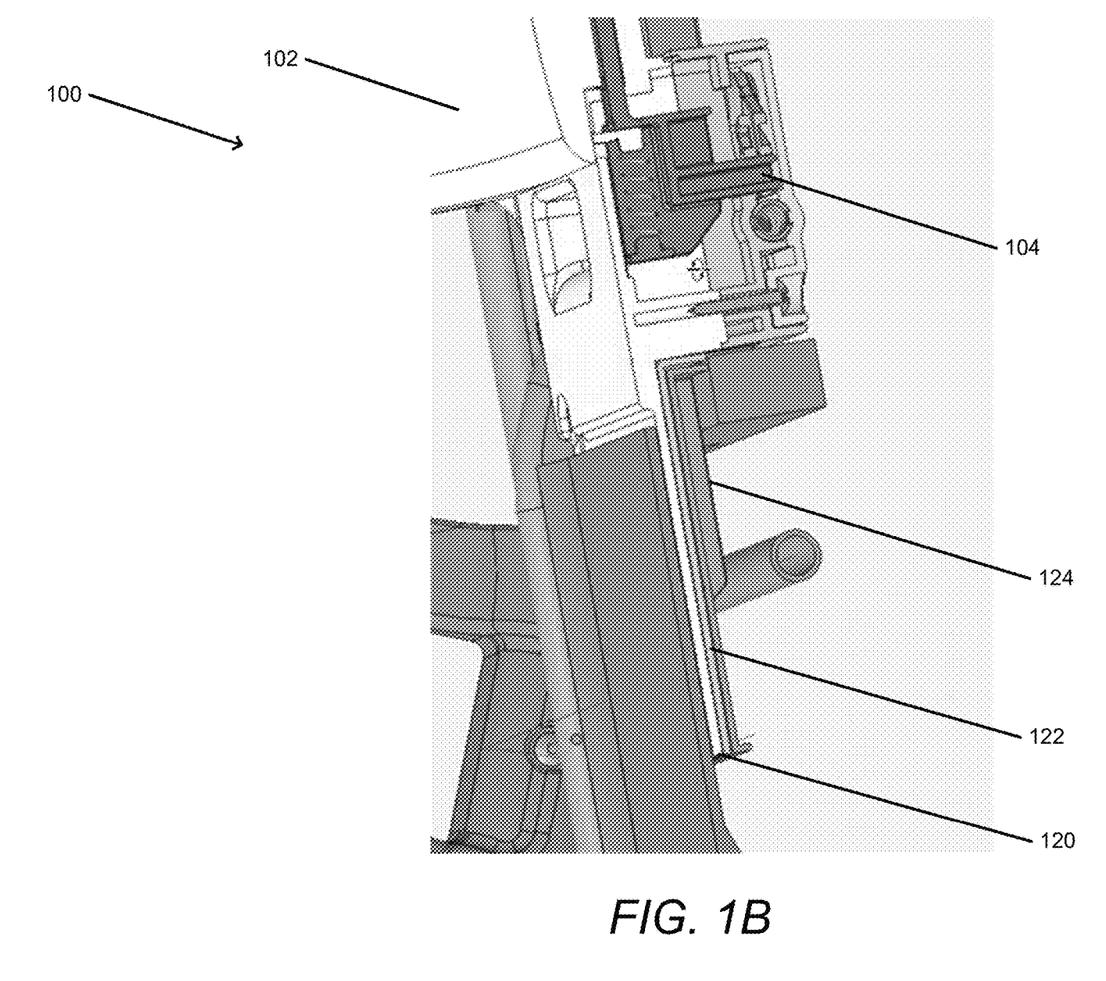

FIGS. 1A-B are renderings of a convertible car seat having an adjustable headrest in accordance with an embodiment of the invention. The convertible car seat 100 includes an outer shell 106 and a base assembly 114. The base assembly 114 includes belt paths and/or a variety of mechanisms, such as a click-tight belt retainer, for mounting the convertible car seat 100 on a vehicle seat in a vehicle. The outer shell 106 has a seating portion 118 and a back portion 116. The seating portion 118 includes a seat 112 holding the child's legs and the back portion 116 includes a seat back holding the child's upper body. The back portion 116 further includes an adjustable headrest 102 supporting the child's head.

In various embodiments, the adjustable headrest 102 of the convertible car seat 100 includes a handle 104, which allows a user to change the position of the adjustable headrest 102. In the collapsed position, a first panel 120, a second panel 122, and a third panel 124 are nested together.

In several embodiments, the adjustable headrest of the convertible car seat can include a button and/or a rotatable knob, which allows a user to change the position of the adjustable headrest. Although the first panel, the second panel, and the third panel are nested together in accordance with embodiments of the invention shown with respect to FIG. 1B, the panels can have any one of a variety of positions, including those that are partially nested or fully nested.

In many embodiments, the convertible car seat 100 can include an energy absorption system 110. In an impact event, the energy absorption system 110 absorbs energy from the impact, limiting the movement of the convertible car seat 100 during the impact event. In a variety of embodiments, the convertible car seat 100 includes an anti-rebound bar 108. Anti-rebound bar 108 can be used when the convertible car seat 100 is installed in a rear-facing configuration and braces against the back of the vehicle seat. The anti-rebound bar 108 helps prevent the convertible car seat 100 from rotating into the vehicle seat back during an impact event when the convertible car seat 100 is installed in a rear-facing configuration.

Figure 2A:
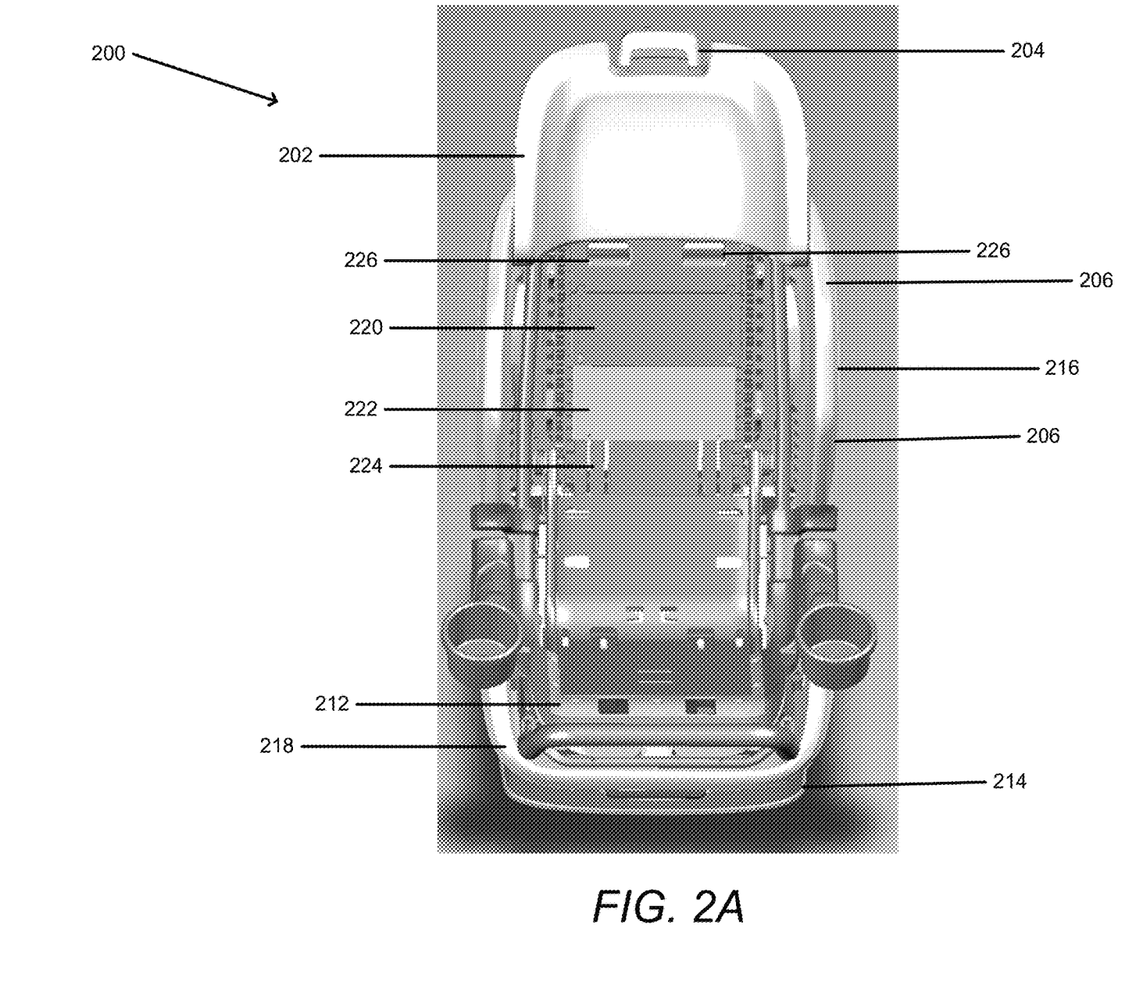
FIG. 2A-B are rendering of a convertible car seat having an adjustable headrest in an extended position in accordance with an embodiment of the invention.
Figure 2B:
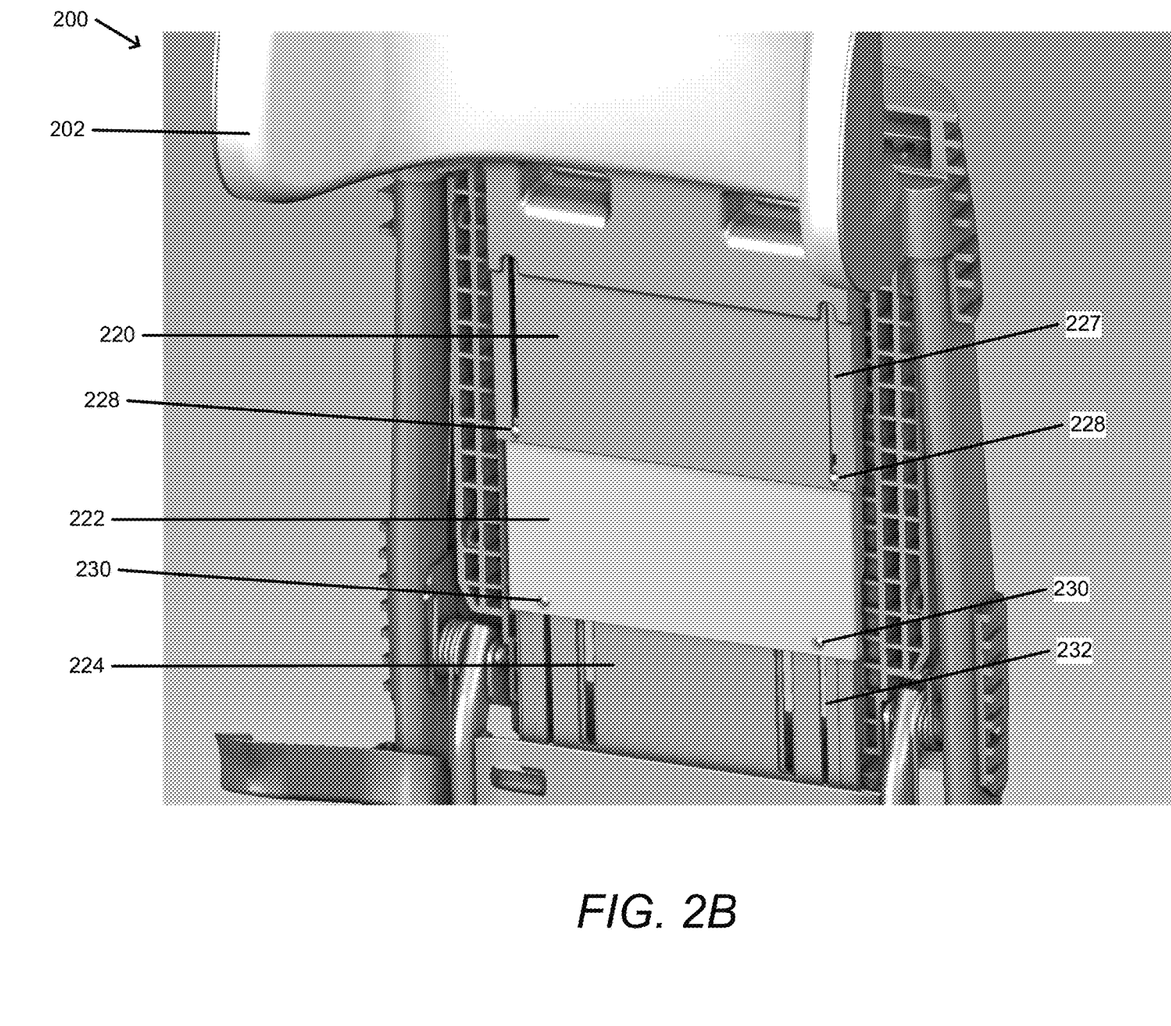

FIGS. 2A-B are renderings of a convertible car seat having an adjustable headrest in an extended position in accordance with an embodiment of the invention. The convertible car seat 200 includes an outer shell 206 and a base assembly 214. The outer shell 206 has a seating portion 218 and a back portion 216. The seating portion 218 includes a seat 212 holding the child's legs and the back portion 216 includes a seat back holding the child's upper body. The back portion 216 has an adjustable headrest 202.

In various embodiments, the adjustable headrest 202 of the convertible car seat 200 includes a handle 204, which allows a user to change the position of the adjustable headrest 202. The first panel 220, the second panel 222, and the third panel 224 extend from each other to provide a solid surface to support the back of the child. While a child is seated in the convertible car seat 200, the first panel 220, the second panel 222, and the third panel 224 are located between the child and the outer shell 206 of the convertible car seat 200. Further, the first panel 220 includes slots 226, which receive the shoulder straps of a harness. At one end, the first panel 220 is fixed to the adjustable headrest 202. Therefore, the location of the slots 226 adjust along with the adjustable headrest 202. At the end opposite of the adjustable headrest 202, the first panel 220 is connected to the second panel 222, which is further connected to the third panel 224.

In several embodiments, the panels can have any one of a variety of designs while providing support to the back of the child. For example, the panels can include apertures for weight savings or increased strength. The panels can also be curved to complement the natural shape of the back of a child. Further, the surface of the panels can be smooth, textured, or ribbed.

In various embodiments, the first panel 220 includes channels 227 on each side of the first panel 220. Tabs 228 extend through each channel 227 and are connected to the second panel 222. The movement of the tabs 228 is restricted to the channels 227 of the first panel 220. When a user adjusts the adjustable headrest 202, the tabs 228 move in the channels 227 corresponding to the user's movement. The engagement between the tabs 228 and the channels 227 keeps the first panel 220 and second panel 222 connected to maintain a solid back surface to support the back of the child. The tabs 228 can include protrusions formed into one or more of the panels and/or any removable element, such as a screw, bolt, rivet, and the like.

In many embodiments, the second panel 222 and the third panel 224 are connected in substantially the same way as the first panel 220 and the second panel 222. The third panel 224 includes channels 232 that extend on each side of the third panel 224. Tabs 230 are connected to the second panel 222 and extend through the channels 232 of the third panel 224. The engagement between the tabs 230 and the channels 232 keep the second panel 222 and third panel 224 connected to maintain a solid back surface to support the back of the child. The connection of the first panel 220 to the second panel 222 and the second channel 222 to the third channel 224 prevents the panels from over-extending and creates a solid surface to support the back of a child regardless of the position of the adjustable headrest 202.

In several embodiments, the panels can be connected in any one of a variety of ways. For example, the first panel can be embedded within the second panel. To prevent overextension, the first panel can include a lip that can slide within the second panel but engage a ridge on the second panel. Further, the second panel can be embedded within the third panel. This structure of the first panel, the second panel, and the third panel would mimic that of a telescope capable of extending and reducing its length.

Although a variety of convertible car seats in accordance with embodiments of the invention are shown with respect to FIGS. 1A-2B, any of a variety of convertible car seats, including those that have fewer or more panels, can be utilized as appropriate to the requirements of specific applications of embodiments of the invention.

Adjustment Mechanism

Figure 3:
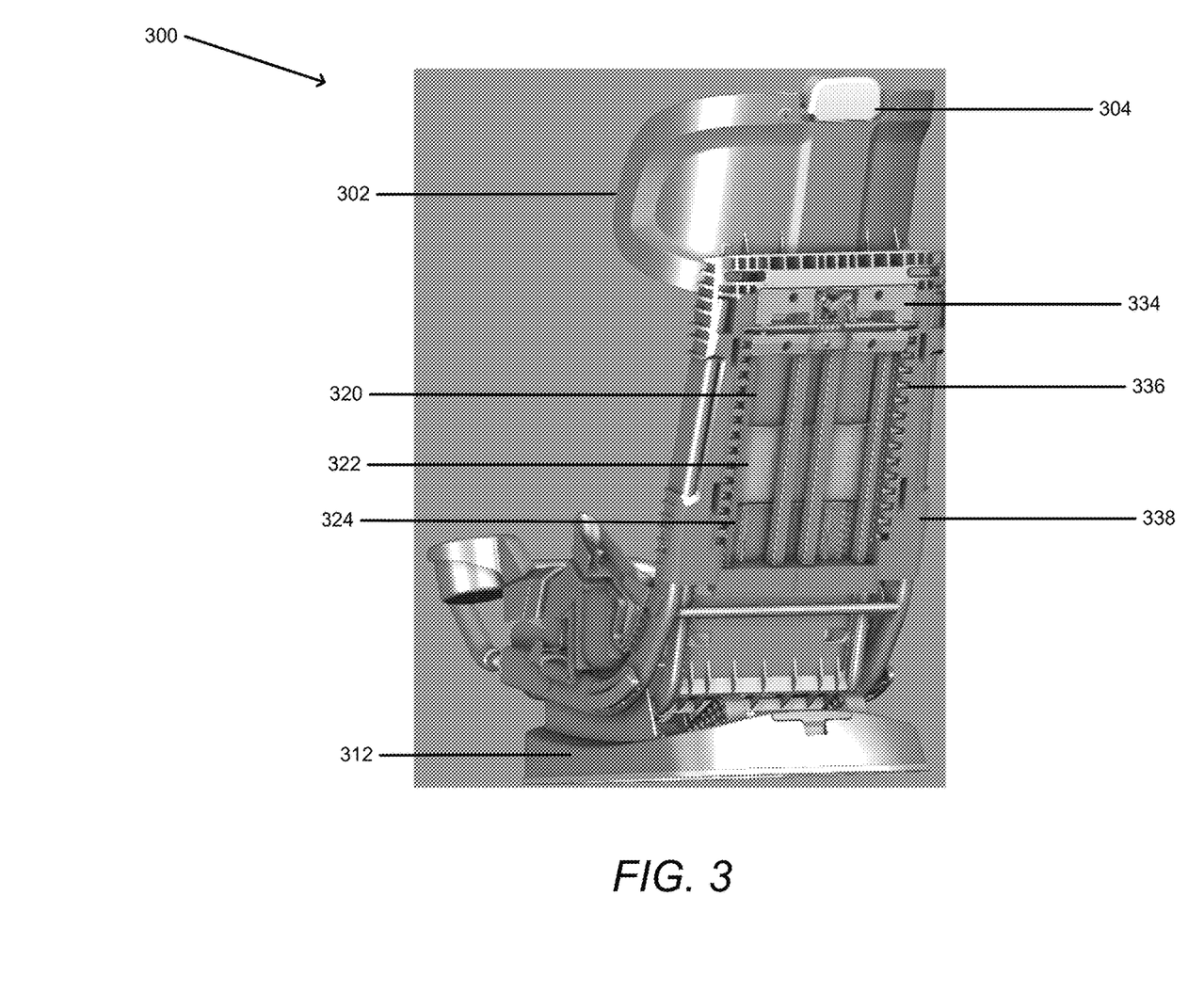
FIG. 3 is a rendering of a convertible car seat having an adjustable headrest in an extended position in accordance with an embodiment of the invention.

FIG. 3 is a rendering of a convertible car seat having an adjustable headrest in an extended position in accordance with an embodiment of the invention. The convertible car seat 300 includes a base assembly 312 and an adjustment mechanism 334. The adjustment mechanism 334 is connected to the back side of the first panel 320. By pulling the handle 304 of the adjustable headrest 302, a user unlocks the adjustment mechanism 334. Once unlocked, a user can move the adjustable headrest 302 to a desired position. Because the adjustable headrest 302 is connected to the first panel 320 and the first panel 220 is connected to adjustment mechanism 334, a user's movement of the adjustment headrest 302 will correspondingly move the first panel 320 and the adjustment mechanism 334 as a single unit. The connection of the first panel 320 to the second panel 322 and the second panel 322 to the third panel 324 causes a user's movement of the adjustable headrest 302 to also move the second panel 322 and the third panel 324.

In a number of embodiments, the first panel, the second panel, and the third panel can move in any one of a variety of ways in relation to one another. For example, when a user pulls the handle to adjust the adjustable headrest, the first panel could completely extend, which could cause the second panel to then extend. The full extension of the second panel could then cause the third panel to begin extending. Additionally, the first panel, the second panel, and the third panel could simultaneously extend, such that every panel is either nested, partially extended, or fully extended.

In many embodiments, the user can unlock the adjustment mechanism in any one of a variety of ways, such as pushing down the handle, pressing a button, or rotating a knob. Further, a preliminary step may be necessary to unlock the handle. For example, a user may be required to laterally pull the handle before the handle is capable of moving to unlock the adjustment mechanism. An additional unlock step could prevent a user from unintentionally moving the handle and thus unlocking the adjustment mechanism. Moreover, a preliminary step would allow a user to use the handle in the locked position to adjust the overall position of the convertible car seat. Or, the handle could be used as a grip when moving the convertible car seat to the vehicle.

In various embodiments, the adjustment mechanism 334 engages pockets 336 in the frame 338 of the convertible car seat 300. The frame 338 of the convertible car seat 300 does not move in relation to the adjustment mechanism 334. And the pockets 336 correspond to various positions in which the adjustable headrest 302 can be in the locked position. For example, when a user pulls the handle 304 of the adjustable headrest 302 to unlock the adjustment mechanism 334, the user can then adjust the adjustable headrest 302 to a desired position. Once in the desired position, the user can release the handle 304, which causes the adjustment mechanism 334 to re-engage the respective pockets 336 for a locked position. As a user adjusts the adjustable headrest 302, the adjustment mechanism 334 slides within the frame 338.

Figure 4:
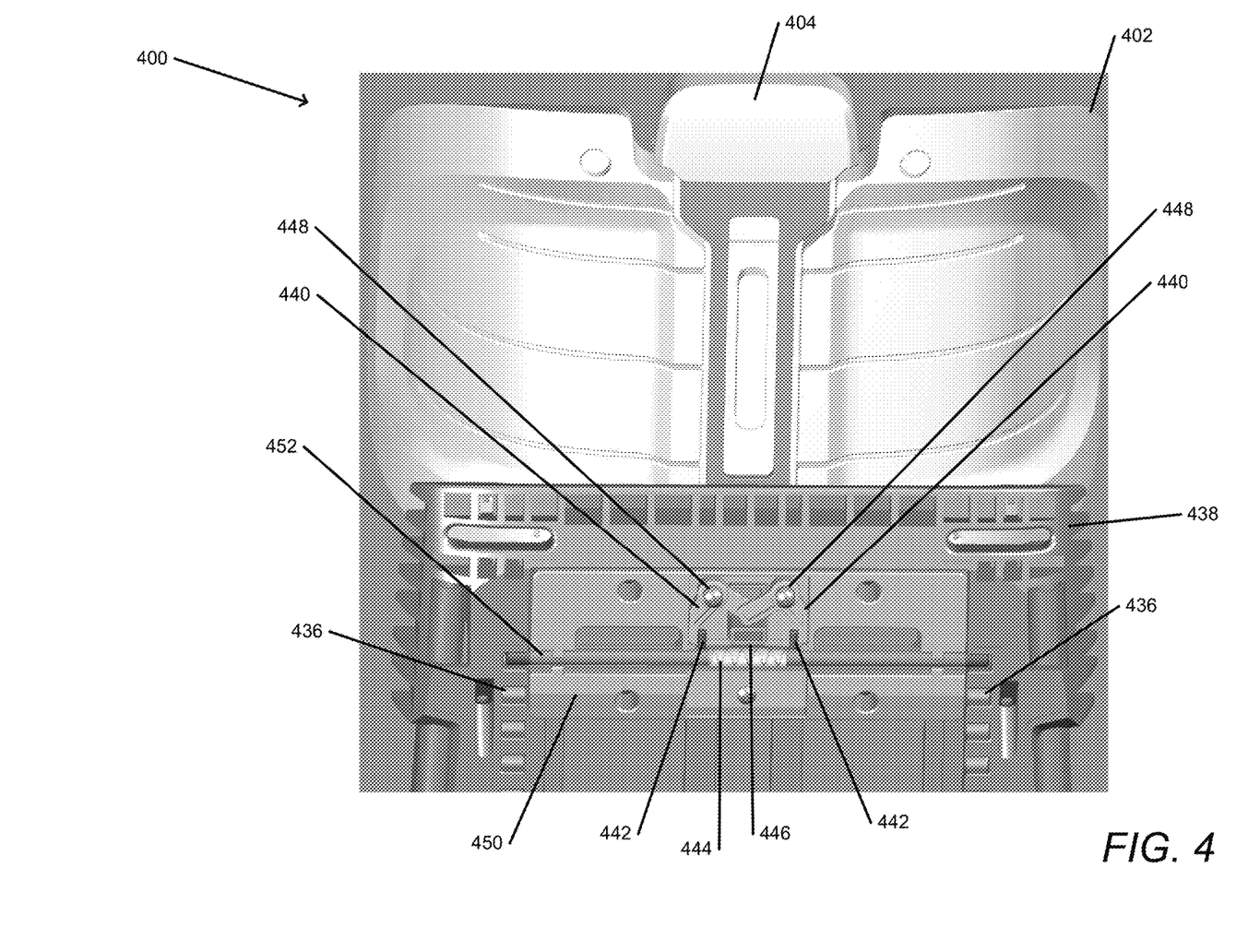
FIG. 4 is a rendering of an adjustment mechanism for an adjustable headrest in accordance with an embodiment of the invention.

FIG. 4 is a rendering of an adjustment mechanism for an adjustable headrest in accordance with an embodiment of the invention. The adjustment mechanism 400 of the adjustable headrest 402 includes a handle 404. The handle 404 includes an actuator 446, which can engage arms 440. Securing elements 448 extend through each arm 440 to connect each arm 440 to the body 450 of the adjustment mechanism 400. The connection between the arms 440 and the adjustment mechanism 400 allow the arms 440 to rotate about the axis of each of the securing elements 448. The securing elements 448 can include protrusions formed into the adjustment mechanism 400, the arms 440, and/or any removable element, such as a screw, bolt, rivet, and the like as appropriate to the requirements of specific applications of embodiments of the invention.

The frame can have one or more pairs of pockets 436. Each pair of pockets 436 can define a position at which the headrest 402 can be placed. The adjustment mechanism 400 includes bars 452, which engage pockets 436 at a first end of the bars 452. The bars 452 include pins 442 located on or near an opposite end of the bars 452. The adjustment mechanism 400 includes a spring 444 located between the bars 452. The spring 444 forces the bars 452 outward and into engagement with the pockets 436. The engagement between the bars 452 and the pockets 436 locks the adjustment mechanism 400 in place. When the adjustment mechanism 400 is in the locked position, the headrest 402 is held in the desired position.

To adjust the adjustable headrest 402, a user pulls the handle 404, which unlocks the adjustment mechanism 400. Once unlocked, a user can adjust the adjustable headrest 402 to a desired position corresponding to the pockets 436 in the frame 438. In a variety of embodiments, when a user pulls the handle 404 upward, the actuator 446 moves upward with the handle 404. The actuator 446 forces the arms 440 to rotate about the securing elements 448. This rotation of the arms 440 translates the vertical force of the actuator 446 into a lateral force. The lateral force of the arms 440 caused by the actuator 446 forces the pins 442 inward, moving the bars 452 out of engagement with the pockets 436. This unlocks the adjustment mechanism 400. Once unlocked, a user can adjust the adjustable headrest 402 to the desired position. Once the desired position is reached, a user can release the handle 404. Without force from the user, the actuator 446 no longer pivots the arms 440. The force of the spring 444 moves the bars 452 outward to re-engage with a pair of pockets 436. When the bars 452 engage the pockets 436, the adjustment mechanism 400 returns to a locked position.

Although a variety of convertible car seats in accordance with embodiments of the invention are shown with respect to FIGS. 3 and 4, any of a variety of convertible car seats, including those that utilize alternative elements for moving the bars in and out of engagement with the openings, can be utilized as appropriate to the requirements of specific applications of embodiments of the invention. For example, the bars can include notches or hooks. The arms of the adjustment mechanism could pull these components inward, thereby disengaging the bars from the pockets. Further, the adjustment mechanism could be vertically flipped, such that pressing the handle downward actuates the pins inward to disengage the bars from the pockets. In several embodiments, the spring can be any one of a variety springs, such as a leaf spring, a spring belt, or a torsion spring. In a number of embodiments, the bars can be pushed outward by a rubber component that compresses when the arms are actuated.

Although the present invention has been described in certain specific aspects, many additional modifications and variations would be apparent to those skilled in the art. In particular, any of the various processes described above can be performed in alternative sequences and/or in parallel in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It will be evident to the annotator skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled annotator, except where expressly required. Accordingly, the scope of the invention should be determined not by the embodiments illustrated, but by the appended claims and their equivalents.

The invention claimed is:

1. A convertible car seat comprising:
a frame having a plurality of pockets;
an adjustable headrest having a handle and an actuator; and
an adjustment mechanism comprising:
a first arm and a second arm rotatably connected to a body of the adjustment mechanism, and
a first bar and a second bar configured to respectively engage a first pocket and a second pocket of the plurality of pockets of the frame in a locked position, wherein the actuator engages the first arm and the second arm to disengage the first bar and the second bar from their respective pockets;
wherein the adjustment mechanism further comprises a first component fixed to the first bar and a second component fixed to the second bar, wherein the first component and the second component are forced inward by the first arm and the second arm thereby disengaging the first bar and the second bar from their respective pockets; and
wherein the adjustment mechanism further comprises a spring configure to force the first bar and the second bar to engage their respective pockets in the locked position.

2. The convertible car seat of claim 1, wherein the adjustable headrest is coupled to a first panel configured to translate with the adjustable headrest, the first panel further comprising a slot configured to receive a strap of a harness.

3. The convertible car seat of claim 2, wherein the first panel is coupled to a second panel and the second panel is coupled to a third panel to create a nested configuration in a first position.

4. The convertible car seat of claim 3, wherein the first panel, the second panel, and the third panel create an extended configuration in a second position.

5. The convertible car seat of claim 1, further comprising an anti-rebound bar configured to brace against a vehicle seat when the convertible car seat is in-stalled in a rear-facing configuration.

6. The convertible car seat of claim 1, wherein:
the convertible car seat is configured to be installed in a vehicle; and
the convertible car seat further comprises an energy absorption system configured to absorbs energy from an impact to the vehicle.

7. A convertible car seat comprising:
a frame having a plurality of pockets;
an adjustable headrest having a handle and an actuator; and
an adjustment mechanism comprising:
a first arm and a second arm rotatably connected to a body of the adjustment mechanism, and
a first bar and a second bar configured to respectively engage a first pocket and a second pocket of the plurality of pockets of the frame in a locked position, wherein the actuator engages the first arm and the second arm to disengage the first bar and the second bar from their respective pockets;

wherein the adjustment mechanism further comprises a first component fixed to the first bar and a second component fixed to the second bar, wherein the first component and the second component are forced inward by the first arm and the second arm thereby disengaging the first bar and the second bar from their respective pockets; and
wherein the first component is a first pin and the second component is a second pin.

8. The convertible car seat of claim 7, wherein the adjustable headrest is coupled to a first panel configured to translate with the adjustable headrest, the first panel further comprising a slot configured to receive a strap of a harness.

9. The convertible car seat of claim 8, wherein the first panel is coupled to a second panel and the second panel is coupled to a third panel to create a nested configuration in a first position.

10. The convertible car seat of claim 9, wherein the first panel, the second panel, and the third panel create an extended configuration in a second position.

11. The convertible car seat of claim 7, further comprising an anti-rebound bar configured to brace against a vehicle seat when the convertible car seat is in-stalled in a rear-facing configuration.

12. The convertible car seat of claim 7, wherein:
the convertible car seat is configured to be installed in a vehicle; and
the convertible car seat further comprises an energy absorption system configured to absorbs energy from an impact to the vehicle.

* * * * *